US00RE38542E1

(19) United States
(12) Reissued Patent
Ashton et al.

(10) Patent Number: US RE38,542 E
(45) Date of Reissued Patent: Jul. 6, 2004

(54) UPPER BUNDLE STEAM GENERATOR CLEANING SYSTEM AND METHOD

(75) Inventors: Augustus Ashton, Westboro, MA (US); Timothy Lovett, Wellesley, MA (US); Daniel L. Fischbach, N. Chelmsford, MA (US)

(73) Assignee: Foster-Miller, Inc., Waltham, MA (US)

(21) Appl. No.: 09/173,570

(22) Filed: Oct. 15, 1998

Related U.S. Patent Documents

Reissue of:
(64) Patent No.: 5,564,371
Issued: Oct. 15, 1996
Appl. No.: 08/239,378
Filed: May 6, 1994

(51) Int. Cl.[7] ..... F22B 37/52

(52) U.S. Cl. ..... 122/392; 122/379; 122/380; 122/384; 122/390; 122/391; 122/405

(58) Field of Search ..... 122/379, 380, 122/384, 390, 391, 392, 405; 376/316

(56) References Cited

U.S. PATENT DOCUMENTS

| | | | | | |
|---|---|---|---|---|---|
| 338,310 | A | * | 3/1886 | Smith | 138/120 |
| 1,905,824 | A | * | 4/1933 | Dysthe | 138/120 |
| 3,120,237 | A | * | 2/1964 | Lang | 134/167 R |
| 3,330,105 | A | * | 7/1967 | Weber | 138/120 |
| 3,599,871 | A | * | 8/1971 | Ruppel et al. | 239/265 |
| 3,655,122 | A | * | 4/1972 | Brown et al. | 134/167 C |
| 4,107,001 | A | * | 8/1978 | Kinzler | 134/167 C |
| 4,219,976 | A | * | 9/1980 | Burack et al. | 134/181 |
| 4,231,419 | A | | 11/1980 | Gugel | |
| 4,384,594 | A | * | 5/1983 | Moritz | 138/120 |
| 4,392,344 | A | * | 7/1983 | Gordon et al. | 138/120 |
| 4,424,769 | A | * | 1/1984 | Charamathieu et al. | 134/172 |

FOREIGN PATENT DOCUMENTS

| | | | |
|---|---|---|---|
| DE | 3044788 | A1 | 7/1982 |
| DE | 4226854 | A | 2/1994 |
| JP | 53-21303 | | 2/1978 |
| JP | 58-132339 | | 9/1983 |
| JP | 58-224218 | | 12/1983 |
| JP | 61-130799 | | 6/1986 |
| JP | 361130798 | A | 6/1986 |
| JP | 62-33299 | | 2/1987 |
| JP | 62-45535 | | 3/1987 |
| JP | 62-74730 | | 4/1987 |
| JP | 62-87720 | | 4/1987 |
| JP | 62-123100 | | 6/1987 |
| JP | 62-241692 | | 10/1987 |
| JP | 63-93587 | | 4/1988 |
| JP | 63-182394 | | 7/1988 |
| JP | 64-31394 | | 2/1989 |
| JP | 5-52592 | | 3/1993 |
| JP | 6-201085 | | 7/1994 |
| JP | 6-274730 | | 9/1994 |
| JP | 6-320473 | | 11/1994 |
| JP | 09026107 | | 1/1997 |
| WO | WO 90/09850 | | 9/1990 |
| WO | WO96/17695 | | 9/1996 |

OTHER PUBLICATIONS

U.S. patent application Ser. No. 09/616,481, Ashton et al., filed Jul. 14, 2000.

*Primary Examiner*—Jiping Lu
(74) *Attorney, Agent, or Firm*—Iandiorio & Teska

(57) ABSTRACT

An upper bundle steam generator cleaning system including a cleaning head deployment and support device receivable through a hand hole of the steam generator and including retractable cylinders which raise the cleaning head up through the flow slots to position a cleaning head about a flow slot of the upper tube bundles; and a cleaning head mounted with the support device for directing fluid about the tubes of the upper bundles of the steam generator for directing fluid about the tubes of the upper bundles of the steam generator thereby cleaning the generator from the top down flushing deposits downward during the cleaning process.

(List continued on next page.)

33 Claims, 11 Drawing Sheets

U.S. PATENT DOCUMENTS 4,478,546 A * 10/1984 Mercer ..... 411/385
4,498,427 A * 2/1985 Todd ..... 122/379
4,572,284 A 2/1986 Katscher et al.
4,637,588 A * 1/1987 Wilhelm et al. ..... 251/280
4,638,667 A * 1/1987 Zimmer et al. ..... 134/167 R
4,656,714 A * 4/1987 Evans et al. ..... 29/157 C
4,667,701 A * 5/1987 Evans et al. ..... 138/93
4,671,326 A * 6/1987 Wilhelm et al. ..... 138/93
4,676,201 A 6/1987 Lahoda et al.
4,682,630 A * 7/1987 Schukei ..... 138/89
4,690,172 A * 9/1987 Everett ..... 138/89
4,691,723 A * 9/1987 Mierswa et al. ..... 134/167 C
4,700,662 A 10/1987 Fasnacht et al.
4,702,281 A * 10/1987 Moritz ..... 138/120
4,723,881 A * 2/1988 Duran ..... 411/353
4,729,423 A 3/1988 Martin
4,744,392 A * 5/1988 Tade, III et al. ..... 138/89
4,769,085 A 9/1988 Booij
4,770,235 A * 9/1988 Rogers, Jr. et al. ..... 165/76
4,826,036 A * 5/1989 Lewis et al. ..... 220/232
4,827,953 A 5/1989 Lee
4,834,069 A * 5/1989 Umeda ..... 128/4
4,844,021 A * 7/1989 Stoss ..... 134/167 C
4,860,919 A * 8/1989 Weisel et al. ..... 220/240
4,887,555 A 12/1989 Smet
4,932,441 A * 6/1990 Corey et al. ..... 138/93
4,954,312 A * 9/1990 McDonald et al. ..... 376/260
4,957,215 A * 9/1990 Evans et al. ..... 220/232
4,959,192 A * 9/1990 Trundle et al. ..... 376/260
4,980,120 A * 12/1990 Bowman et al. ..... 134/172
4,989,818 A * 2/1991 Trundle et al. ..... 248/332
5,006,302 A * 4/1991 Trundle et al. ..... 376/260
5,007,460 A * 4/1991 Zezza et al. ..... 138/89
5,032,048 A * 7/1991 Walton et al. ..... 411/433
5,032,350 A * 7/1991 McDonald et al. ..... 376/260
5,036,871 A * 8/1991 Ruggieri et al. ..... 134/167 R
5,042,861 A * 8/1991 Trundle et al. ..... 294/19.1
5,048,570 A * 9/1991 Weisel et al. ..... 138/93
5,065,703 A * 11/1991 Lee ..... 134/172
5,135,330 A * 8/1992 Chen ..... 403/374
5,164,151 A * 11/1992 Shah et al. ..... 376/260
H1115 H 12/1992 Nachbar
5,167,905 A * 12/1992 Mentz et al. ..... 376/204
5,169,594 A * 12/1992 Tade, III et al. ..... 376/260
5,171,514 A * 12/1992 Veronesi et al. ..... 376/204
5,172,653 A * 12/1992 Vadakin ..... 134/167 C
5,178,129 A * 1/1993 Chikama et al. ..... 138/120
5,184,636 A * 2/1993 van der Woude ..... 134/167 C
5,194,217 A * 3/1993 St. Louis et al. ..... 134/167 C
5,205,693 A * 4/1993 Fuller et al. ..... 411/354
5,238,054 A * 8/1993 Ritz et al. ..... 165/71
5,261,600 A * 11/1993 Cradeur ..... 239/753
5,265,129 A * 11/1993 Brooks et al. ..... 376/248
5,286,154 A 2/1994 Jens et al.
5,292,074 A 3/1994 Clark et al.
5,305,713 A * 4/1994 Vadakin ..... 122/391
5,341,406 A * 8/1994 Jens et al. ..... 376/316
5,348,234 A * 9/1994 Woude ..... 239/753
5,411,043 A 5/1995 Kamler
5,570,660 A 11/1996 Vandenberg
5,615,734 A 4/1997 Hyp
5,638,415 A 6/1997 Nafziger et al.
5,782,209 A 7/1998 Vandenberg
5,913,320 A 6/1999 Varrin, Jr. et al.

* cited by examiner

UPPER BUNDLE STEAM GENERATOR CLEANING SYSTEM AND METHOD

Matter enclosed in heavy brackets [ ] appears in the original patent but forms no part of this reissue specification; matter printed in italics indicates the additions made by reissue.

FIELD OF INVENTION

This invention relates to an upper bundle cleaning system for a nuclear power plant steam generator which eliminates the need to use chemical cleaning techniques.

BACKGROUND OF INVENTION

Steam generators convert heat from the primary side of a nuclear power plant to steam on the secondary side so that the primary and secondary systems are kept separate. A typical generator is a vertical cylinder consisting of a large number of U-shaped tubes which extend from the floor or "tube sheet" of the generator. High temperature and pressure fluid from the reactor travels through the tubes giving up energy to a feed water blanket surrounding the tubes in the generator creating steam and ultimately power when later introduced to turbines.

Steam generators were designed to last upwards of forty years but in practice such reliability figures have proven not to be the case. The problem is that sludge from particulate impurities suspended in the feed water forms on the tubes which greatly affects the efficiency of the generator and can even cause the tubes to degrade to the point of causing fissures in the tubes. If radioactive primary fluid within the tubes seeps into the secondary side, the result can be disastrous. Plugging or otherwise servicing such fissures is time consuming and results in expensive down time during which power must be purchased from other sources at a great expense.

There are known methods for cleaning the tubes proximate the bottom of the steam generator using flexible lances and the like which clean the tubes using water under pressure, but since a typical steam generator can be thirty feet tall, it is difficult to reach the sludge at the upper levels of the tubes using water jets. So, chemical cleaning is used but there are several disadvantages. First, chemical cleaning is very expensive (from $5,000,000 to $10,000,000 per application) and requires an extended outage. Also, some corrosion of steam generator internals by the solvents used will occur during the cleaning. In addition, large quantities of hazardous, possibly radioactive waste may be generated. Disposal of this waste is very expensive. For these reasons, although many utilities have considered chemical cleaning, few plants have actually implemented chemical cleaning.

On the other hand, there are severe technical challenges faced when considering alternate cleaning methods. A typical steam generator has approximately 50,000 square feet of heat transfer area. The tube bundle is about 10 feet in diameter and 30 feet tall but the access alley in the middle of the tube bundle is only 3.5 inches wide and is interrupted by support plates approximately every 4 feet. There are flow slots through the support plates but they are very small in size, typically 2.75 by 15 inches. In addition, the access into the steam generator is limited to a six inch hand hole. Finally, inter tube gaps are only 0.406 wide or smaller.

Thus, the inherent design parameters of a typical steam generator make it difficult to incorporate water jet sludge lancing techniques at the upper tube bundles even though these techniques are adequate to clean the tubes at the level of the tube sheet at the bottom most portion of the steam generator. See, e.g. U.S. Pat. Nos. 4,700,662; 4,980,120; 4,887,555; 4,676,201; and 4,769,085.

SUMMARY OF INVENTION

It is therefore an object of this invention to provide an upper bundle steam generator cleaning system.

It is a further object of this invention to provide such an upper bundle steam generator cleaning system which cleans the generator from the top down thereby flushing deposits downward during the cleaning process.

It is a further object of this invention to provide such an upper bundle steam generator cleaning system which eliminates the need to use chemical cleaning techniques and overcomes the disadvantages inherent in chemical cleaning or which can be used in conjunction with chemical cleaning.

It is a further object of this invention to provide such an upper bundle steam generator cleaning system which adequately cleans the upper bundles of the steam generator using water under pressure even within the close confines of the tubes of the steam generator.

It is a further object of this invention to provide such an upper bundle steam generator cleaning system which successfully delivers sufficient water energy to remove scale and also distributes this energy in an efficient manner throughout the tube bundle.

It is a further object of this invention to provide such an upper bundle steam generator cleaning system which accomplishes cleaning remotely thereby overcoming the access restrictions of the steam generator as well as reducing exposure of personnel to radiation.

It is a further object of this invention to provide such an upper bundle steam generator cleaning system which maximizes cleaning effectiveness with a minimum use of water.

It is a further object of this invention to provide such an upper bundle steam generator cleaning system which minimizes the number of equipment moves during the cleaning procedure thereby reducing cleaning and hence outage time.

It is a further object of this invention to provide such an upper bundle steam generator cleaning system which utilizes both a bulk cleaning head and a rigid lance for intertube inspection and cleaning.

It is a further object of this invention to provide a method for cleaning the steam generator from the top down thereby flushing deposited downward during the cleaning process using the system of this invention.

This invention results from the realization that the most effective way to clean a steam generator is from the top down thereby flushing deposits downward as the cleaning process progresses; that there is an access path to the upper regions of the steam generator and that these upper regions of the steam generator can be cleaned without chemical cleaning techniques if a cleaning head which delivers fluid under pressure about the tubes can be deployed along this access path from the bottom of the steam generator and then raised up through successive flow slots into position; and furthermore that all the tubes on one side of the steam generator at one level can be cleaned from one flow slot thereby minimizing equipment moves and cleaning time; that a mechanical swinging arm can be used for bulk cleaning; that alignment of the nozzles of the swing arm first on one side of the tube gap and then on the other side to clean all the surfaces of the tubes maximizes cleaning effectiveness with a minimum use of water; and that a rigid lance which extends between the rows of tubes accomplishes effective inter-tube cleaning.

This invention features and may suitably comprise, include, consist essentially of and/or consist of an upper bundle steam generator cleaning system. There is a cleaning head means deployment and support device receivable through a hand hole of the steam generator which includes means to position a cleaning head about a flow slot of the upper bundles of the steam generator. The cleaning head means mounted with the support device directs fluid about the tubes of the upper bundles of the steam generator for cleaning the generator from the top down thereby flushing deposits downward during the cleaning process.

The cleaning head means deployment and support device includes a translation rail extending between a hand hole of the steam generator and the center tie rod along the blow down lane. There is a rotation stage including a number of vertically extendable cylinders pivotably mounted on the translation rail.

One head means includes means for directing fluid between the tubes from a flow slot such as an arm extendable along the direction of the flow slot wherein the arm includes a plurality of nozzles alienable with the spaces between the tubes. A number of the nozzles are opposed to each other for cleaning tubes on opposite sides of a flow slot at the same time and for balancing the thrust received by the arm. There are means for changing the pitch orientation of the nozzles and for rotating the arm to spray fluid about tubes proximate an adjacent flow slot.

Another cleaning head includes means for directing fluid between the tubes from in between the tubes. The means for directing fluid from between the tubes includes a lance extendable in between the tubes; the lance has a number of nozzles for spraying fluid about the tubes from in between the tubes. The lance is rotatable from a position about the support device for deployment of the cleaning head to a position between the tubes for cleaning.

The system further includes means for releasably supporting the cleaning heads about a flow slot. The means for releasably supporting includes rotatable fingers engagable with a side wall of a flow slot in a tube sheet support plate.

This invention also features an upper bundle nuclear power plant steam generator cleaning system for cleaning the generator from the top down thereby flushing deposits downward during the cleaning process, the system comprising: a cleaning head deployment and support device including means for positioning a cleaning head at a flow slot about the upper bundles of a steam generator; a bulk cleaning head affixable to the support device including means for directing fluid in between the tubes from the flow slot; and, a cleaning head lance also affixable to the support device including means for directing fluid in between the tubes from between the tubes.

The bulk cleaning head includes an arm extendable along the direction of a flow slot, the arm having plurality of nozzles alingable with the spaces between the tubes proximate the flow slot. A number of the nozzles are opposed to each other for cleaning tubes on opposite sides of the flow slot at the same time and balancing the thrust received by the arm. The system further includes means for changing the pitch orientation of the nozzle and for rotating the arm to spray fluid about tubes proximate ad adjacent flow slot. The cleaning head lance is extendable between the tubes and has a number of nozzles for spraying fluid about the tubes from between the tubes. The lance is rotatable from a position about the support device for deployment to a position between the tubes for cleaning. The system further includes means for supporting the bulk cleaning heads about a tube sheet support of the steam generator.

Finally, this invention features a method of cleaning a steam generator from the top down: a cleaning head device is inserted through a hand hold of the steam generator and deployed to a position about the upper tubes bundles of the steam generator; fluid is directed about the tube bundles proximate the cleaning head device; the cleaning head is successively lowered and repositioned proximate the next lower flow slot and fluid is again directed about the tube bundles proximate the cleaning head device thereby flushing deposits downward during the cleaning process.

The method includes spraying the tubes from the cleaning head located about one flow slot wherein the cleaning head is positioned to clean tubes proximate one flow slot; is moved to a position proximate an adjacent flow slot for cleaning tubes proximate that flow slot; and moved again to a position proximate another adjacent flow slot for cleaning tubes proximate that adjacent flow slot thereby achieving full coverage without retracting the cleaning head device through the flow slots.

The method also includes spraying water first on one side of the tube gap and then on the other side of the tube gap for effective cleaning and water conservation. Finally, the method includes filing the steam generator with water and lowering the level of water as the cleaning process progresses to provide an agitation action and enhanced cleaning as the water from the cleaning head spray nozzles strikes the surface of the water within the steam generator.

DISCLOSURE OF PREFERRED EMBODIMENT

Other objects, features and advantages will occur to those skilled in the art from the following description of a preferred embodiment and the accompanying drawings, in which.

Figure 1:
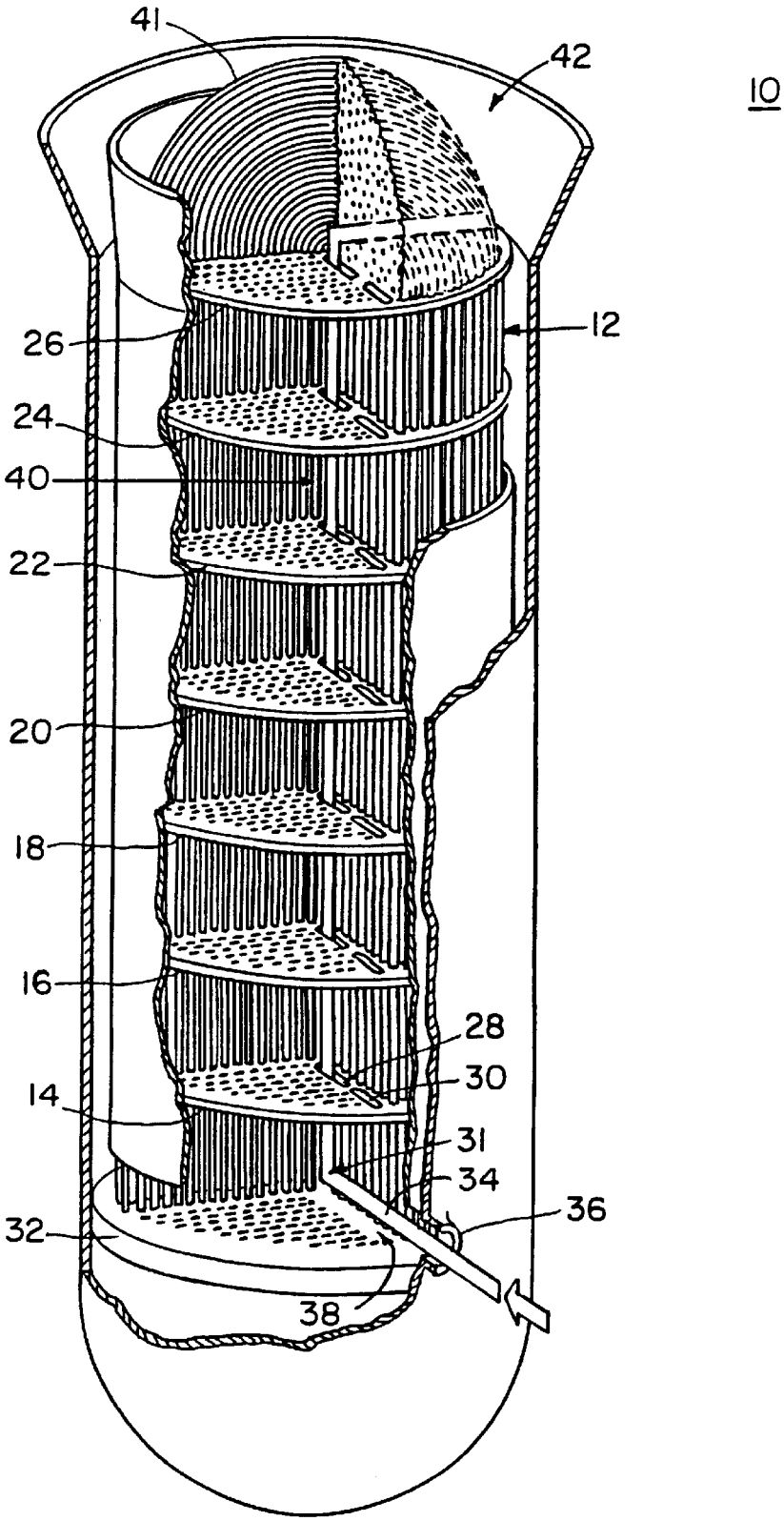
FIG. 1 is a schematic, partially cut away view of a typical steam generator of a nuclear power plant.

FIG. 1 schematically shows steam generator 10 which includes heat transfer tubes 12 separated into sections by tube support plates 14, 16, 18, 20, 22, 24 and 26. Each tube support plate includes a number of flow slots 28 and 30 as shown for first tube support plate 14.

The Westinghouse model W44 and W51 steam generators comprise the largest steam generator market segment and the dimensions of the W51 are similar to the W44. The W44 steam generator utilizes 116" diameter tube support plates spaced evenly at 51" above the tube sheet. There are two 6" diameter hand holes such as hand hole 36 at each end of the 3 ½" blow down lane 38 at the tube sheet 32 level. Each tube sheet support plate has three flow slots measuring 2–2 ¾ by 15" spaced at 4" inches on each side of the center tie rod 40. The flow slots are aligned with respect to each other so that there is a clear "line of sight" vertical passage from the blow down lane 38 to the U-bends 41 of the tubes above the top tube support plate 26.

As discussed in the Background of the Invention above, there are known instruments for water-spray cleaning the areas between tube sheet 32 and first tube sheet support plate 14 at the bottom of the steam generator but the very close confines within the upper bundles of the steam generator make cleaning the tubes near the upper support plates 16–26 very difficult. See, e.g., U.S. Pat. No. 5,265,129.

In this invention, it was realized that there is an access path 34 from hand hole 36 along blow down lane 38 to the center tie rod 40 and then upwards through the aligned flow slots 28, 30, etc. in each support plate to the top portion 42 of the steam generator. And, it was realized that if a cleaning head or heads could be deployed to the top portion 42 of the steam generator, the generator could be cleaned from the top down thereby flushing deposits downward during the cleaning process. The technical challenge is to design cleaning heads which will fit within the close confines of the interior of the steam generator, to design cleaning heads which will still deliver water under sufficient pressure to thoroughly clean the tubes, and to design cleaning heads which will not become jammed inside the steam generator.

The upper bundle steam generator cleaning system of this invention, wherein an "upper bundle" is defined as those tubes within the steam generator above the first tube support plate 14, includes four main subsystems or components: (a) the cleaning head deployment and support device shown in FIG. 2; (b) a bulk cleaning head affixable to the support/deployment device which directs fluid in between the tubes from the flow slots and includes means to change the pitch of the spray and to clean the tubes proximate an adjacent flow slot at the same level as shown in FIGS. 3–7; (c) a rigid lance also affixable to the support/deployment subsystem which extends in between the tubes and directs fluid from between the tubes as shown in FIGS. 7–10 and (d) a support mechanism which releasably fixes and supports either type of cleaning head in place during spraying and also conveniently prevents equipment jams which could severely affect the cleaning process and cause down time. Each subsystem is discussed in turn.

The Deployment/Support SubSystem

Figure 2:
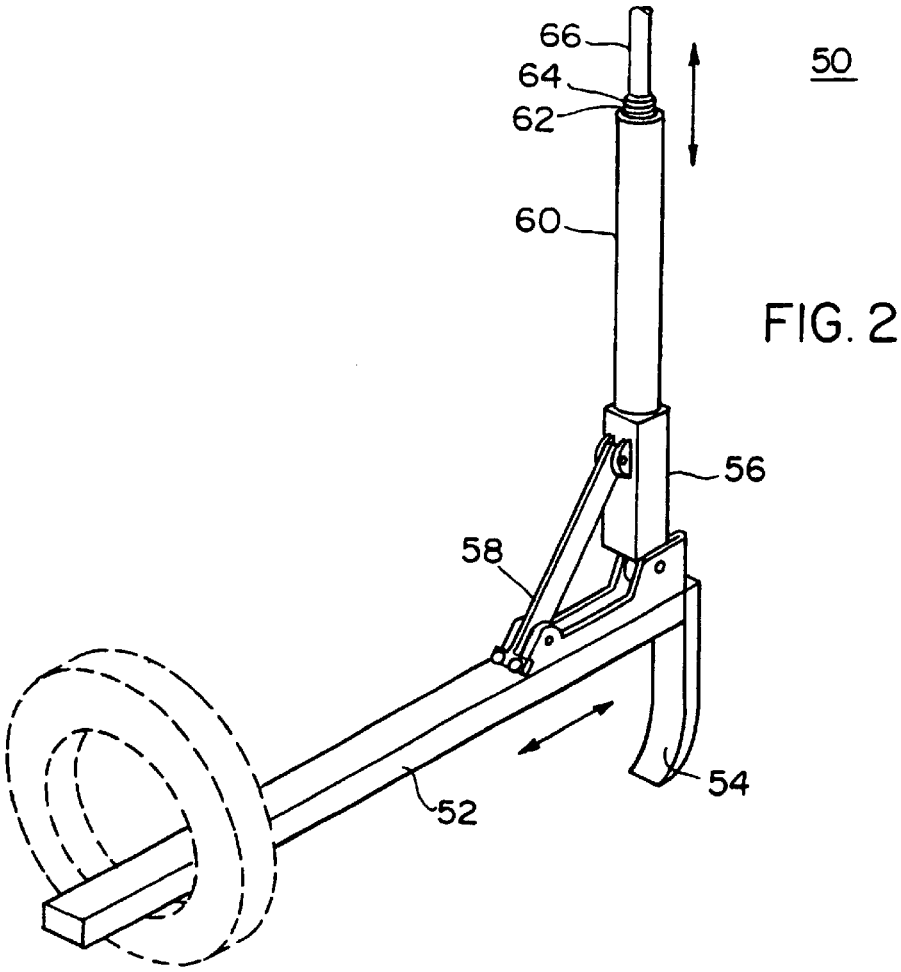
FIG. 2 is a schematic view of the deployment subsystem used to deploy and support various cleaning heads at different levels within the steam generator shown in FIG. 1.

The deployment subsystem 50, FIG. 2, includes translation rail 52, rail support 54, rotation stage 56, translation cart 58, and vertical position subsystem 60, including hydraulic cylinders 62, 64, 66. Deployment subsystem 50 is the mechanism used to deploy a spray head vertically within the steam generator to the elevation of the tube support plate to be accessed. Vertical positioning subsystem 60 is mounted at the top of rotation stage 56 which in turn rides on translation cart 58. Using motive means located outside the steam generator, the cart is caused to move down the blow down lane on rail 52 that is deployed through the hand hole.

This design is adapted from an existing design called the "Secondary Inspection Device (SID)" available from R. Brooks Associates of 6546 Pound Road, Williamson, N.Y., 14589 (see U.S. Pat. No. 5,265,129) and is a nine stage pneumatic cylinder currently used to transport a video camera up the blow down lane of a steam generator. Consequently, it is sized appropriately to pass through the hand hole and the flow slots of the steam generator. In its normal configuration, however, the secondary inspection device has several major shortcomings. The first of these is lack of control. The current control procedure is to increase cylinder air pressure to extend and reduce pressure to either retract or cease extending. Since the interstage seals permit significant leakage, it is frequently difficult to achieve a stable position. Also, since interstage friction plays a role in establishing an equilibrium position, anything which changes interstage friction, such as vibration, will cause the system to seek a new equilibrium position.

The other major short coming is an inadequate pay load capability. As a result of interstage seal leakage and small passages through the pressure regulator and supply hose, actual cylinder pressure can never be made to approach the pressure of the air supply and pay load is limited to about 5 pounds. Accordingly, this payload capability must be improved by a factor of 5–10 to support the cleaning heads of this invention.

A modification is made to incorporate cables inside the cylinders and a cable reel to control payout and takeup. Pressure inside the cylinders is maintained at a constant value, high enough to produce extension but held in check by the cable. Paying out the tension cable permits extension and taking up cable produces retraction. Cylinder pressure relief is provided for the retraction step. The cable reel is equipped with an encoder which would supply vertical position information. To improve the payload, internal pressure is increased, and cylinder weight decreased or both. Interstage seals are improved to greatly reduce leakage and pressurization is provided by water rather than air. Using water as a pressurization medium, internal pressures are several hundred psi are possible without creating an explosion hazard as would be the case with a compressible medium. Also, fabricating the cylinders from aluminum rather than steel reduces by about ⅔ the weight of the cylinders themselves. The control system is further discussed with reference to FIG. 14.

The Bulk Cleaning Head Subsystem

Figure 3:
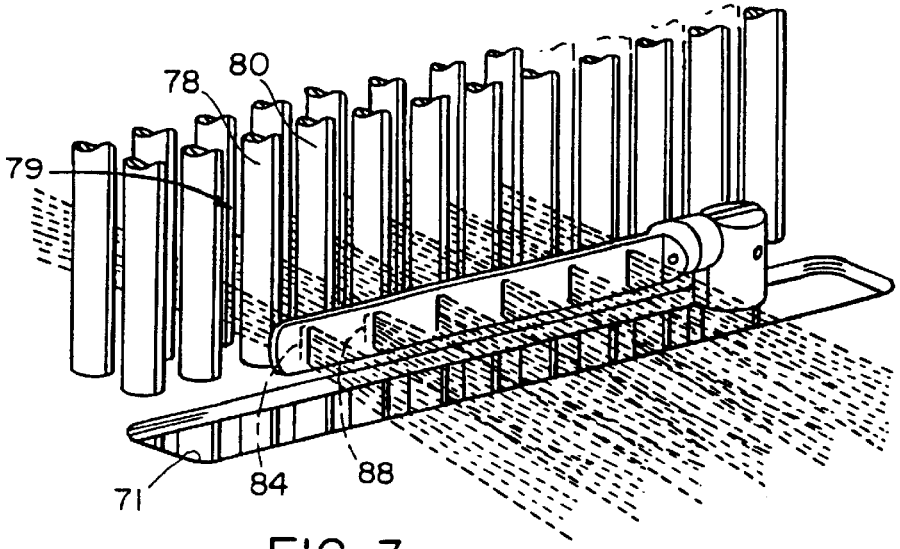
FIG. 3 is a schematic view of the bulk cleaning head subsystem of this invention used to direct water from the flow slots of the tube support plates of the steam generator.

Bulk cleaning head subsystem 70, FIG. 3, is mounted on top cylinder 66 of deployment/support subsystem 50, FIG. 2, and includes arm 72 extending from pivot support 74. The bulk cleaning head subsystem of this invention shown in FIG. 3 directs fluid in between the tubes from the flow slot.

Figure 4:
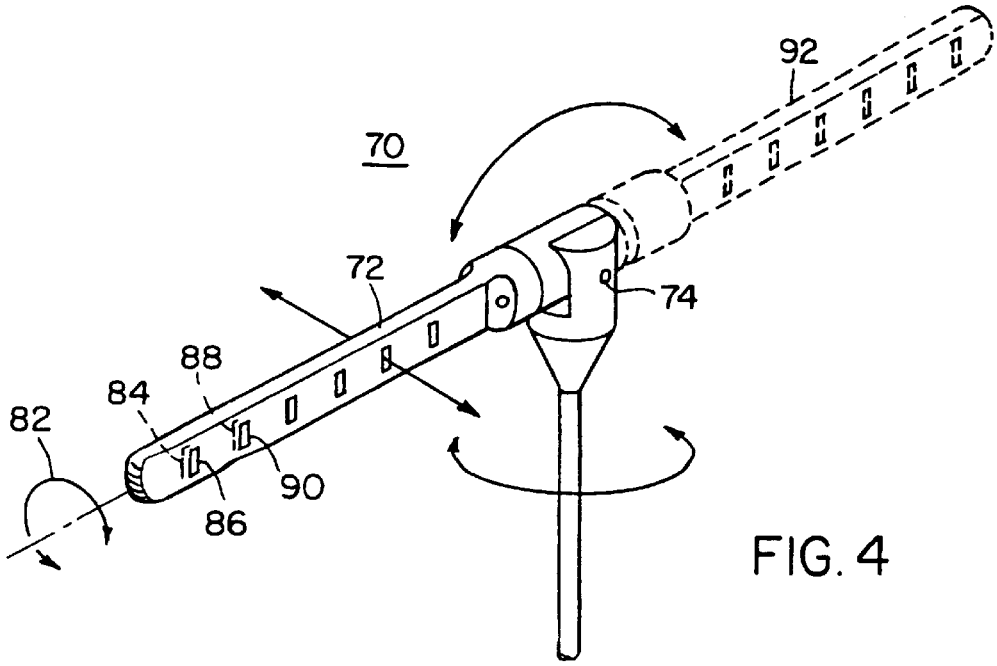
FIG. 4 is a schematic view of the bulk cleaning head subsystem of FIG. 3 shown in place within a flow slot directing water between rows of tubes.

Bulk cleaning subsystem 70 extends along a flow slot such as flow slot 71, FIG. 4, and directs fluid in between the tubes 78, 80 from flow slot 71. Arm 72, FIG. 3, also rotates in the direction shown by arrow 82 to change the pitch orientation of the opposing nozzles 84, 86, 88, and 90 to clean the length of the tubes in between two support plates and also the surfaces of the support plates. Nozzles 84, 88 oppose nozzles 86, 90 as shown in order to effect cleaning of the tubes on both sides of flow slot 71 and also to balance the thrust received by arm 72 due to the high pressure water delivered by the nozzles. Nozzles 86 and 90 are spaced appropriately to align with the spaces in between tubes 78, 80, FIG. 4.

Arm 70 also swings over to the position shown in relief at 92 to clean the tubes proximate an adjacent flow slot without having to retract the cleaning head and deploy it up through the adjacent flow slot.

Figure 5A:
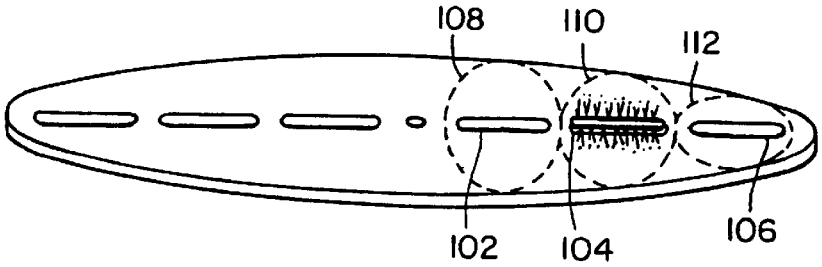
FIGS. 5A–5C are top plan views of the methodology of cleaning the various sectors of one level of a typical steam generator using the bulk cleaning head system shown in FIGS. 3–4.
Figure 5B:
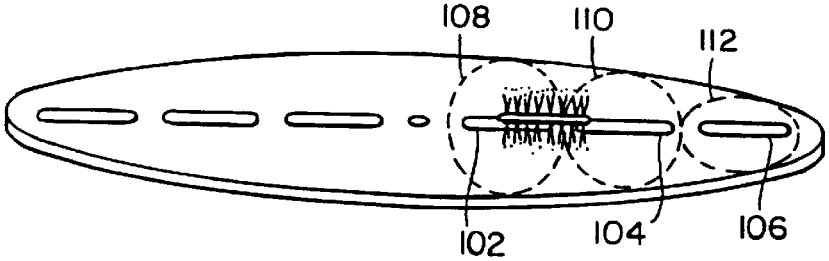
Figure 5C:
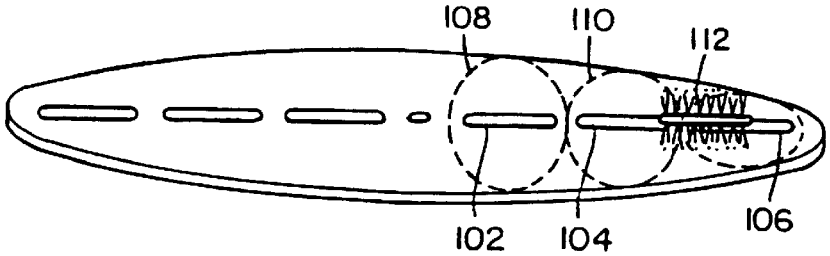

More particularly, as shown in FIGS. 5A–5C, arm 100, FIG. 5A, is first orientated about flow slot 104 (typically the center flow slot of a three flow slot per side steam generator design) to spray water in sector 110 proximate flow slot 104; the arm is then moved over within flow slot 104 to spray water in sector 108, FIG. 5B; and finally the arm is caused to swing over to clean sector 112, FIG. 5C, proximate flow slot 106.

In this way, one complete side of the steam generator is cleaned while the cleaning head deployment and support equipment extends through one series of vertically aligned flow slots. So, the bulk cleaning head subsystem is deployed to top flow slot 25, FIG. 1, within top support plate 26 and the cleaning operation depicted in FIGS. 5A–5C is accomplished (pitch changes made as necessary) and this process is repeated at each level of the steam generator down to the first tubes support plate 14 effecting top to bottom cleaning and thereby flushing deposits downward during the cleaning process. The other side of the steam generator is cleaned in the same manner.

Another aspect of this invention involves using specific nozzle alignment for bulk cleaning to maximize cleaning effectiveness with a minimum use of water. Specifically, the nozzles 84, 88 etc. are aligned first on one side of the tube gap 79, and then on the other side of the tube gap 79 to clean one side of the tubes and then the other. In testing, this procedure had a significant impact on the cleaning effectiveness and was instrumental in increasing the amount of sludge removed from the tube surfaces. Other testing variables included sludge type, nozzle pressure, nozzle flow rate, tilt speed, bulk cleaner location, nozzle design, and nozzle alignment. A prototype design proved that a bulk cleaning head directing water from the blow down lane can remove tube surface deposits and clean support plates and quatrefoils. Still another aspect of this the cleaning methodology of this invention involves slowly lowering the level of water within the steam generator as cleaning progresses top to bottom with the cleaning heads. In this way, additional agitation is provided and cleaning is enhanced as the nozzle jet spray strikes the surface of the water within the generator.

Figure 6:
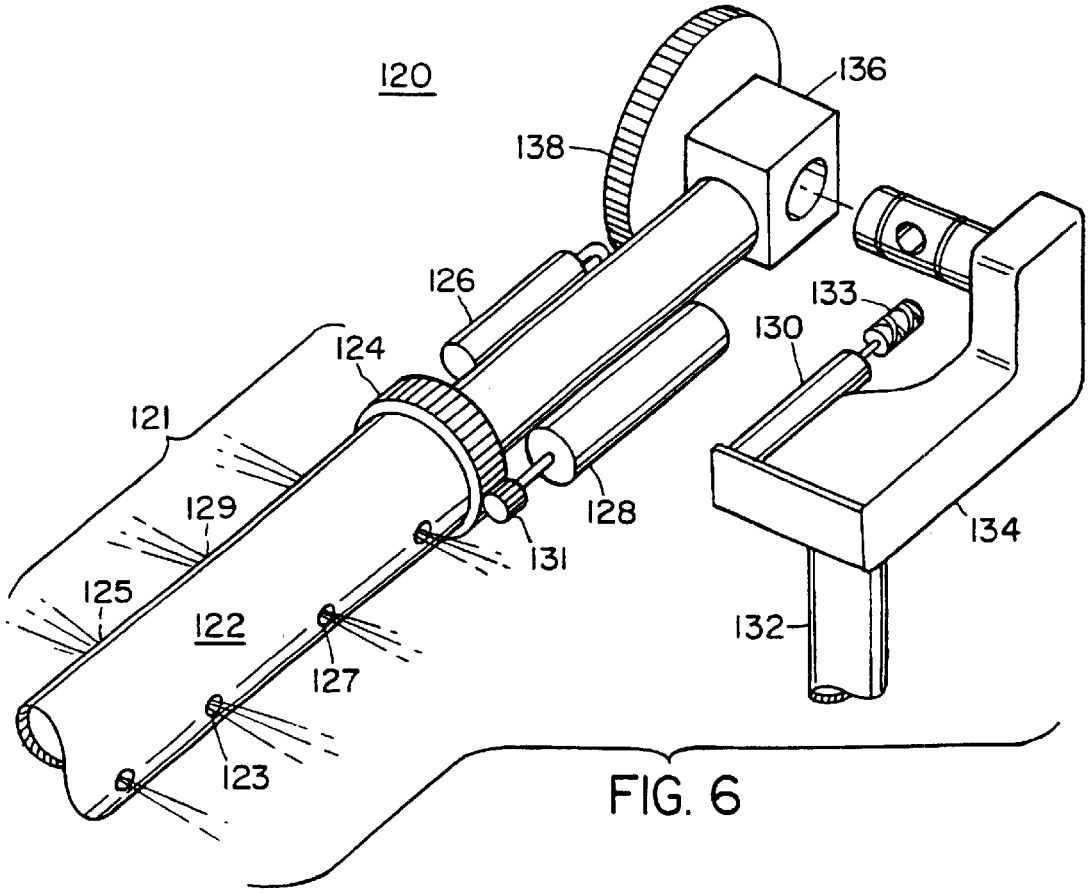
FIG. 6 is a schematic view of the various components of the bulk cleaning head subsystem depicting the mechanisms which effect spray pitch control and swinging of the spray nozzle arm.

FIG. 6 schematically shows the prototype design of bulk cleaning head subsystem 120. Nozzle arm 121 includes barrel portion 122 having opposing nozzles 123, 125, 127, 129, the pitch of which are varied by tilt gear 124 powered by tilt motor 128 by means of gear 131. Swinging of arm 121 is accomplished by means of swing gear 138 powered by swing motor 130 through worm gear 133. Water is supplied to nozzles 123, 125, 127, and 129 through umbilical source 132 thorough water manifold 134. Camera 126 provides the operator with alignment and inspection compatibility. Power for camera 126, motor 130 and motor 128 is provided thorough umbilical source 132.

The Rigid Lance

Figure 7D:
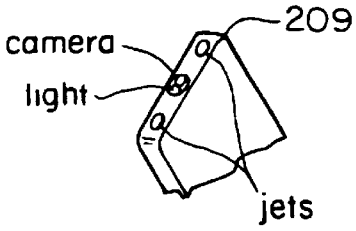
FIGS. 7A–7D are schematic views of the rigid lance cleaning head subsystem of this invention used which is inserted in between the tubes thereby directing water under pressure in between the tubes of the steam generator from between the tubes.
Figure 7A:
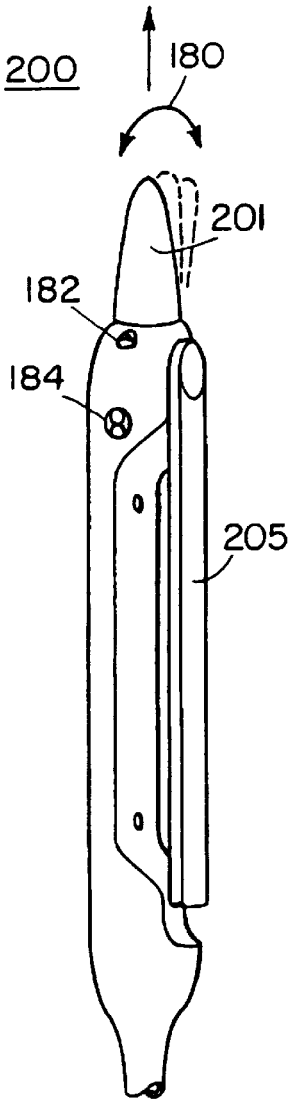
Figure 7B:
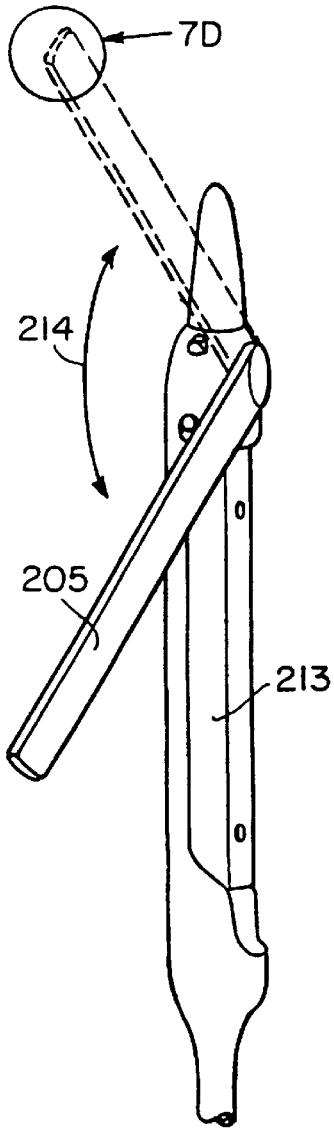
Figure 7C:
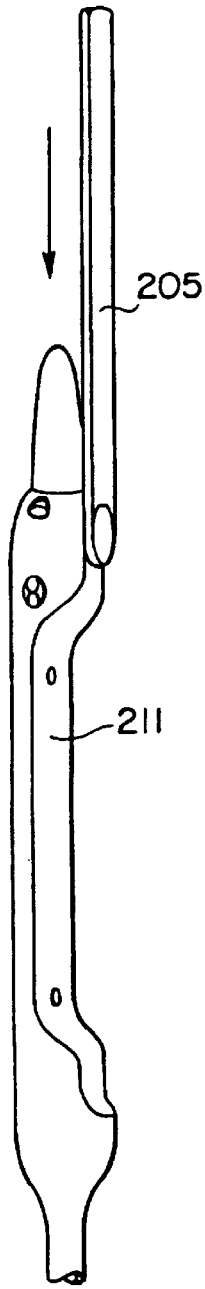
Figures 8A, 8B, 8C:
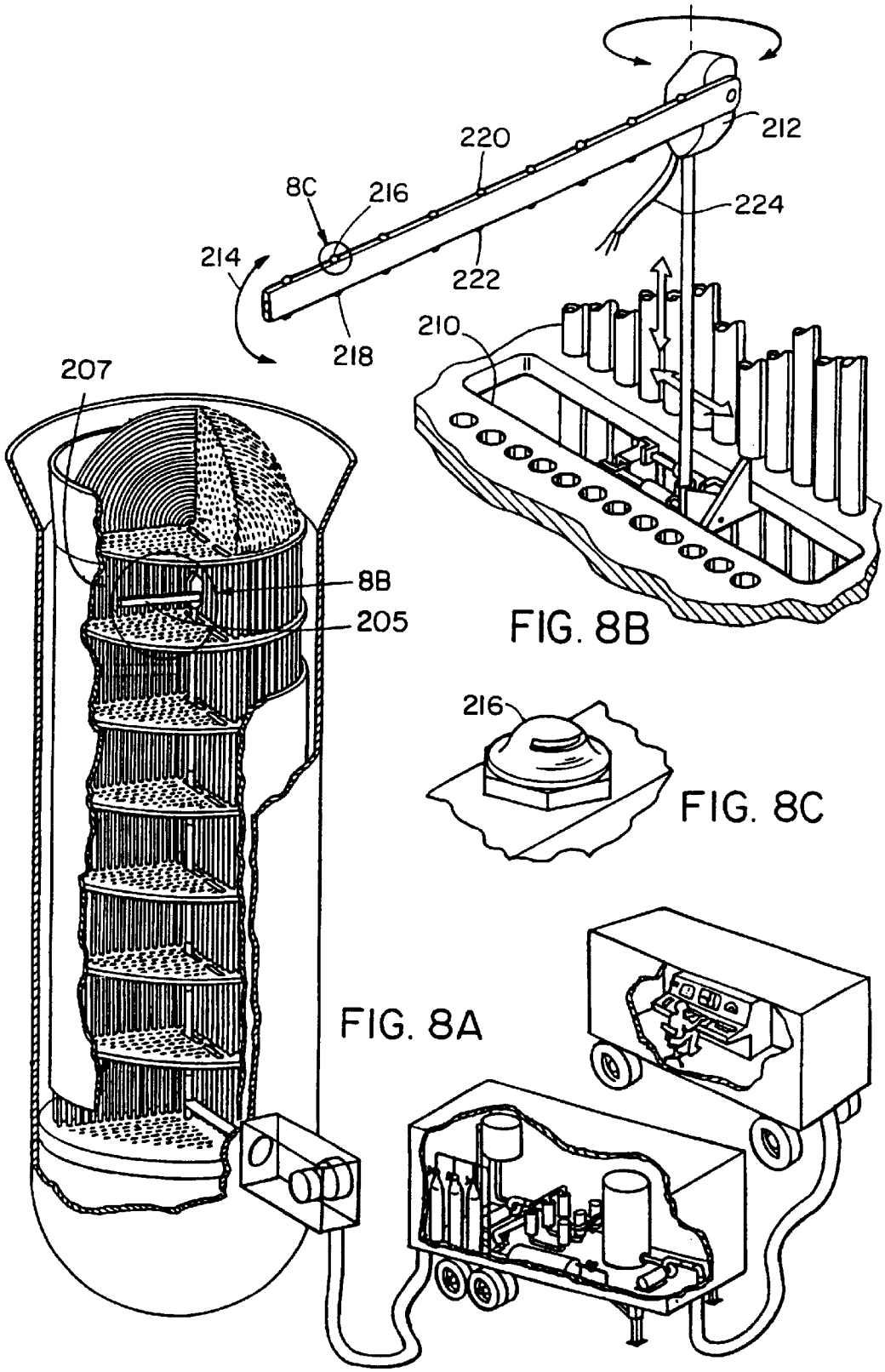
FIGS. 8A–8C are schematic views of the rigid lance of FIGS. 7A–7C shown in place at one level of a steam generator.

Rigid lance 200, FIG. 7A, is another type of spray head mountable to deployment subsystem 50, FIG. 2, and is used to direct fluid in between the rows of tubes from between the tubes. Lance portion 205, FIG. 7A, rotates as shown in FIGS. 7B and 7C to a position as shown in FIG. 8A extending between tube row 207. In this way, lance 205, FIG. 7A, is positioned in line with the top cylinder of the support subsystem during deployment up through flow slot 210, FIG. 8B, where it is then rotated in the direction shown by arrow 214 by lance drive motor 212 to extend between a particular row of tubes. Then, jet nozzles 216, (FIGS. 8B and 8C) 218, 220, and 222 direct fluid from high pressure water source 224 to the tubes.

Figure 9:
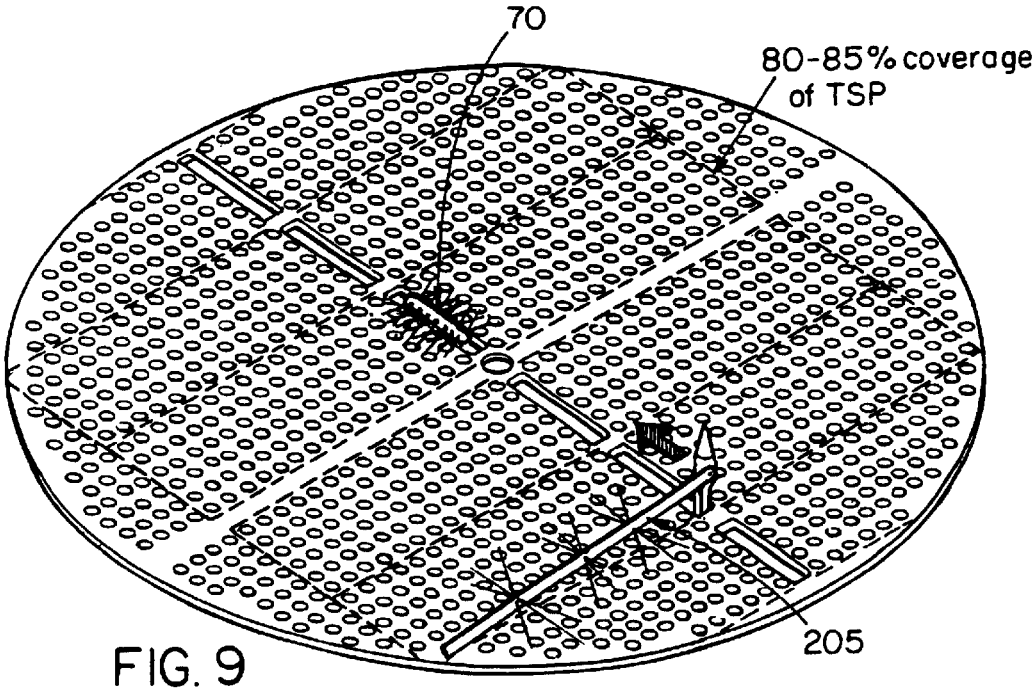
FIG. 9 is a schematic view showing typical tube support plate coverage utilizing both the bulk cleaning head subsystem and the rigid lance according to this invention.

As shown in FIG. 9 the areas of tubes not cleaned using bulk cleaning head subsystem 70 which sprays water from a flow slot are cleaned using lance 205 which can be inserted between rows of tubes. At the upper most end of rigid lance 200, FIG. 7A is bullet nose piece 201 which can be manually inclined slightly as shown by arrow 108 to snake its way up through the flow slots regardless of minor slot misalignment or flexibility of the telescoping cylinder assembly of the deployment/support device shown in FIG. 2. Bullet nose 201 is deflected with the use of one cable tether which works against an offset spring. By rotating the head around its vertical axis with the rotary stage, the nose deflection can be orientated in any direction. Since the rigid lance subsystem cleaning head will be traveling into regions from which significant amounts of sensory data must be obtained, it is essential that the head be outfitted with several eyes 182, 184 to keep the operator up to date on its whereabouts and the status of the inspection and cleaning activities.

To enable the operator to align the bullet nose 201 with the next flow slot as the head traverses up to the tube sheet support plate of interest, one CCD video camera is mounted within the head and aimed upwards as shown for camera 184. If appropriate, two video cameras would be mounted in horizontal opposition in the head to enable viewing down the no tube lane and at the tubes immediately adjacent thereto. To provide viewing capability in the intertube lanes, video probes can be mounted on the lance tip 209 shown in FIG. 7D. CCD chips are positioned to enable inspection of the crevice areas and observation of the water jetting operations. The cables for these videos probes are routed through the rotary stage on the blow down lane cart and out the hand hole. To simplify the user interface, the signals would be multiplexed to a remote operator station where the video image of choice can be displayed. As indicated in FIG. 7C, if slightly reduced coverage of the intertube lanes is not acceptable at the tube sheet support plate, the recess 211 in the head formed by the offset as shown can serve to hold an optional tooling module 213 shown in FIG. 7B to suit the task at hand. For example, a sample holding bin can be mounted at this point so that tube scale could be reliably transported out of the steam generator for analysis.

In general, the intertube lance of this invention accomplishes visual inspection, crevice cleaning, tube descaling, tube sheet plate flushing, corrosion sampling, and foreign object search and retrieval. Lance 205 must be as long as possible but cannot exceed the vertical spacing of the tube sheet support plates or else it can not be rotated from the vertical. Since the radii of both the W44 and the W51 generator tube sheet plates are greater than the vertical spacing of the tube sheet plates, there is an area shown in FIG. 9 that the rigid lance cannot reach at the furthest point from the no tube lane. The total percent area that is within the reach of the rigid lance, however, is estimated to be over 85% for the W44 and over 80% for the W51.

Lance 200, FIGS. 7A–7C is a slender 2 ½" diameter housing inside which is mounted a rotary drive (not shown) to position the rigid ¼" arm 205. Water jets at the tip of the lance are orientated so that they direct debris back toward the flow slots in the no tube lance since there is no reliable means to move debris from the periphery of the tube support plate.

Figure 10A:
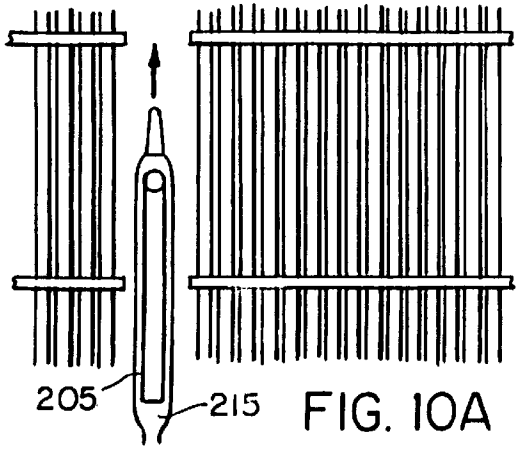
FIGS. 10A–10D are schematic views showing the various positions for inspecting, cleaning, and descaling tube bundles using the rigid lance of FIGS. 6–7.
Figure 10B:
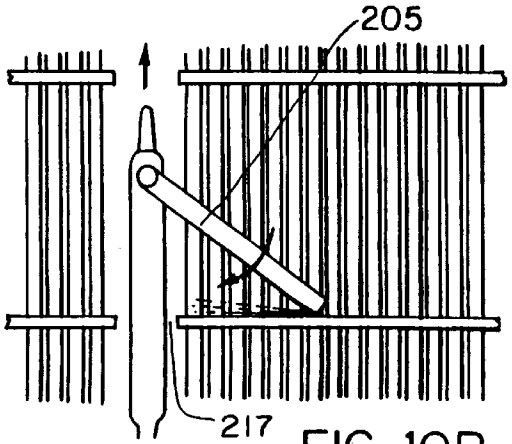
Figure 10C:
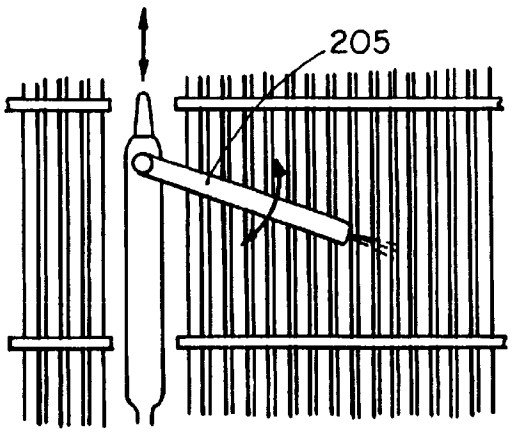
Figure 10D:
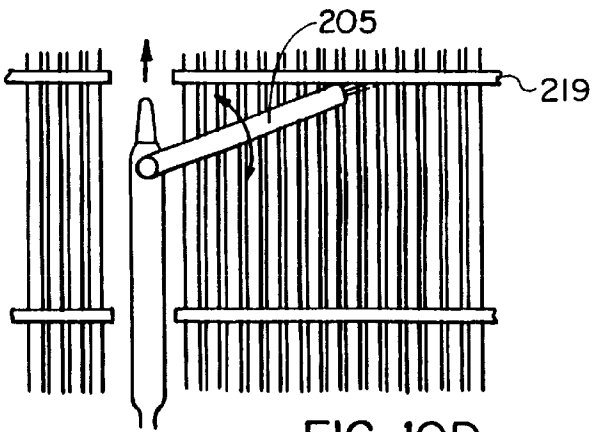

FIGS. 10A–10D show the orientation of the lance with respect to the head during deployment and various cleaning operations. FIG. 10A shows lance 205 aligned with head 215 for deployment and raising the cleaning head to the tube sheet support plate of interest; FIG. 10B shows a downward sweeping action of lance 205 to flush debris towards flow slot 217; FIG. 10C depicts lance 205 sweeping back and forth for descaling the tubes; while FIG. 10D depicts lance 205 in position for inspecting the under side of tube support plate 219.

The Support Mechanism

Figure 11:
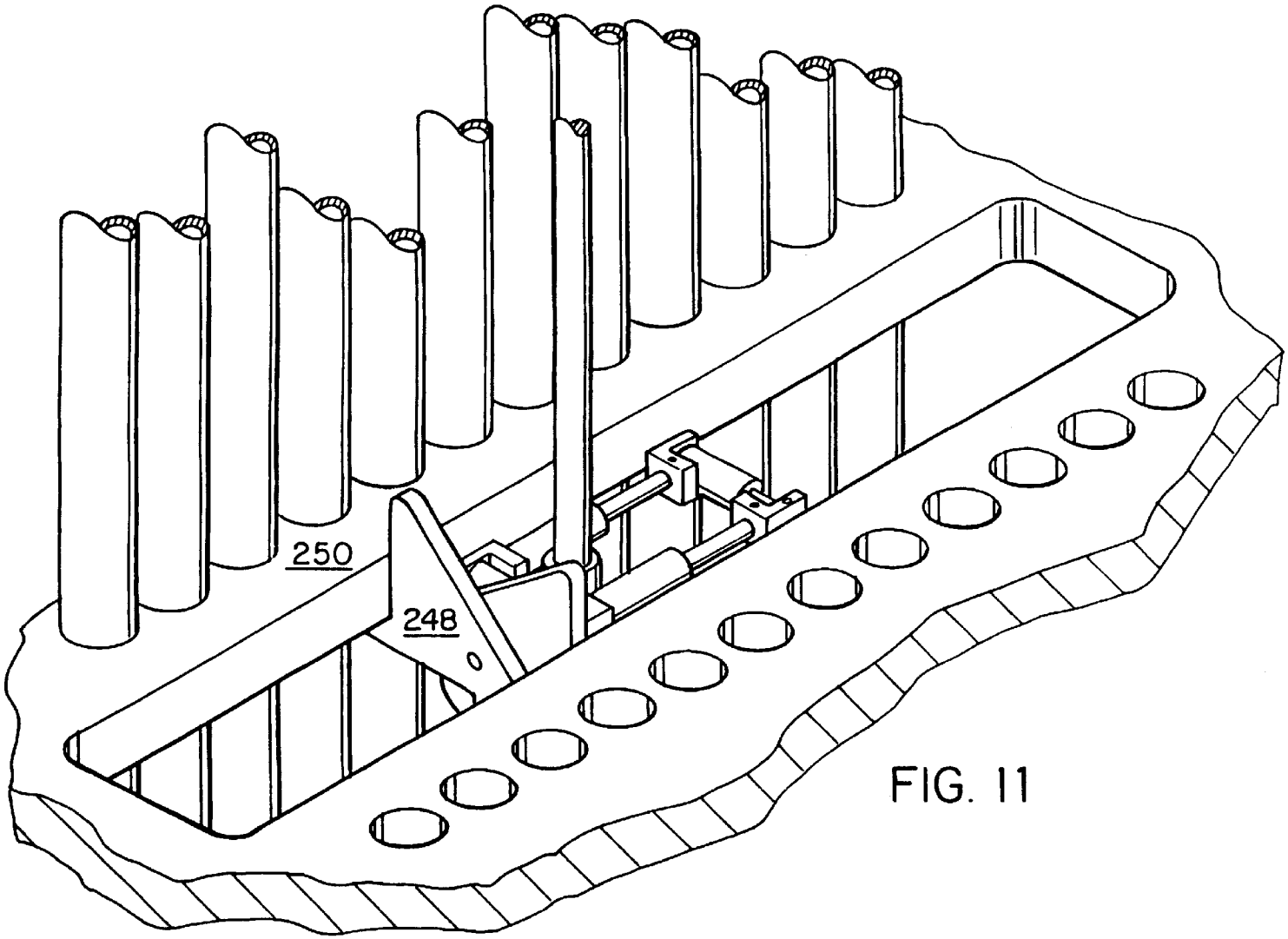
FIG. 11 is a schematic three dimensional view of the support subsystem of this invention for maintaining a particular cleaning head in position during the application of high pressure fluid to the cleaning head.

Although the vertical deployment and support system will be laterally supported on the bottom of the tube sheet, it is necessary to provide lateral support at the top proximate the deployed spray head as well. During cleaning of the upper spans of the steam generator, the vertical deployment and support system will be extended up to 25 feet. Sideloads will be applied during lance insertion into and retraction from the tube bundle as well as during jet sweeping operations. The upper lateral support subsystem of this invention is shown in FIG. 11 and provides mechanical engagement with and disengagement from a tube support plate such as tube support plate 250 and requires no additional actuators.

Figure 12C:
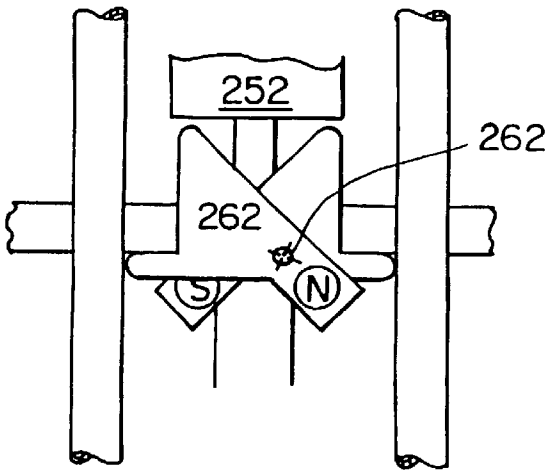
FIGS. 12A–12C are schematic front views showing the support subsystem passing through and ultimately engaging a support plate of a typical steam generator.
Figure 12B:
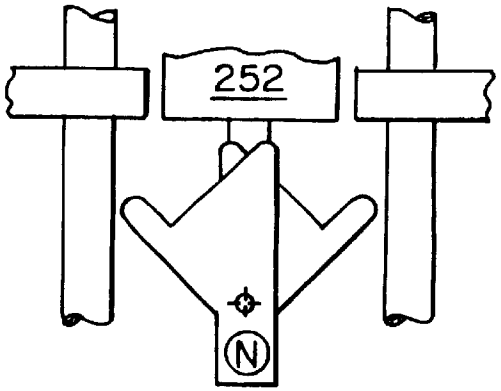
Figure 12A:
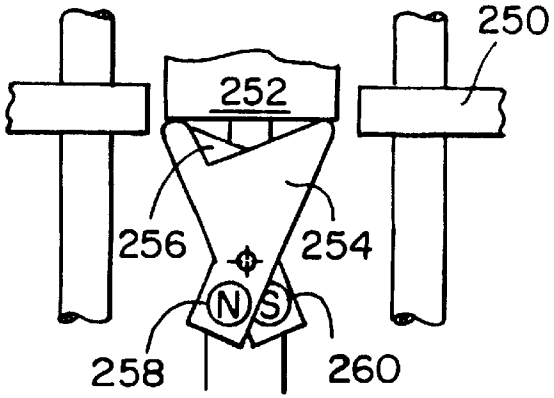

As shown in FIG. 12A, upon approaching the tube support plate 250 of interest, the pay load 252 (one of the spray heads discussed above) is lifted slightly to allow fingers 254 and 256 to open as shown in FIG. 12B. Magnets 258 and 260 assist indexing to a position shown in FIG. 12B. With fingers 254 and 256 in the open position, further extension of the vertical deployment system will rotate the fingers into the locked positioned as shown in FIG. 12C. Cleaning operations are then conducted using the vertical motion of the upper most cylinder of the deployment/subsystem shown in FIG. 2 with the lateral support system locked and the cylinders below stationary. Disengagement is accomplished by a reversing the procedure. The lower cylinders are retracted which will pull down on the lateral support system pivot pin 262 and friction on the pads which bear against the flow slot cause the finger assemblies to rotate into the position shown in FIG. 12B as the lower cylinders are retracted. The retraction of the independent upper cylinder would then cause the fingers to fold into the stowed positioned as shown in FIG. 12A and permit passage through the flow slots to a new deployment location.

Retrieval is a concern where any equipment is deployed into the inner regions of the steam generator. Emergency retrieval according to this invention is accomplished by tension on the cylinder extension control cable which is attached to the second stage cylinder. If the fingers are in the stowed positioned as shown in FIG. 12B, when emergency retrieval is initiated, no interference will occur. If the fingers are in the ready position as shown in FIG. 12B, contact with each tube support plate on the way down will simply rotate them inwardly sufficient to pass through the flow slot. If the lateral support system is engaged as shown in FIG. 12C, when emergency retrieval is initiated, sufficient tension will be applied to the cable to overcome the friction associated with the lateral support system contact with the tube support plate. If the pay load is completely down and resting on the fingers, contact with the next support plate during retraction rotates the fingers inward and lifts the payload to the stowed configuration of FIG. 12A.

Other Subsystems

Figure 13:
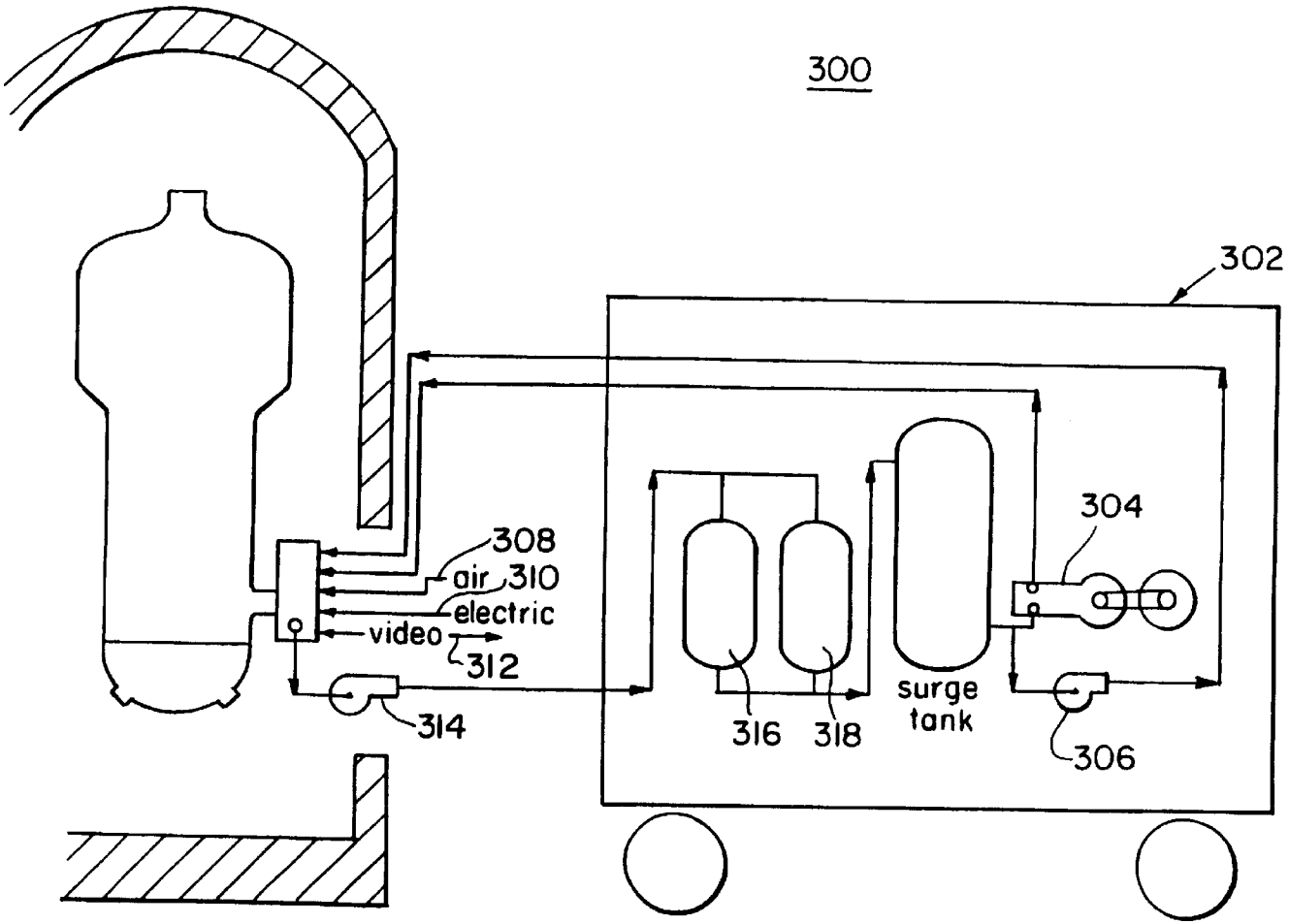
FIG. 13 is a schematic view of the process system of this invention for supplying water and video hook ups to the cleaning heads of this invention.

There is shown in FIG. 13 process subsystem 300 which supplies high pressure water to the jets of each spray head, low pressure water to the vertical deployment system cylinders, air and electric power as needed and video feedback from the cleaning system. Process subsystem 300 also provides for suction from the steam generator to maintains a stable level during lancing and it will filter that water sufficiently for recirculation to the water jet spray nozzles of the cleaning heads. The majority of the process system will be located in trailer 302 outside of the containment building and is very similar to that employed for tubeshet sludge lancing today. High pressure water is supplied to the nozzle jet of each cleaning head via high pressure pump 304, low pressure water is supplied to the deployment/support subsystem cylinders by low pressure pump 306 and air electric, and video signals are transmitted via lines 308, 310 and 312 respectively. Suction pump 314 maintain a stable level during lancing and filters 316 and 318 filter the water from pump 314 sufficiently for recirculization to the water jet spray nozzles via high pressure pump 304.

Figure 14:
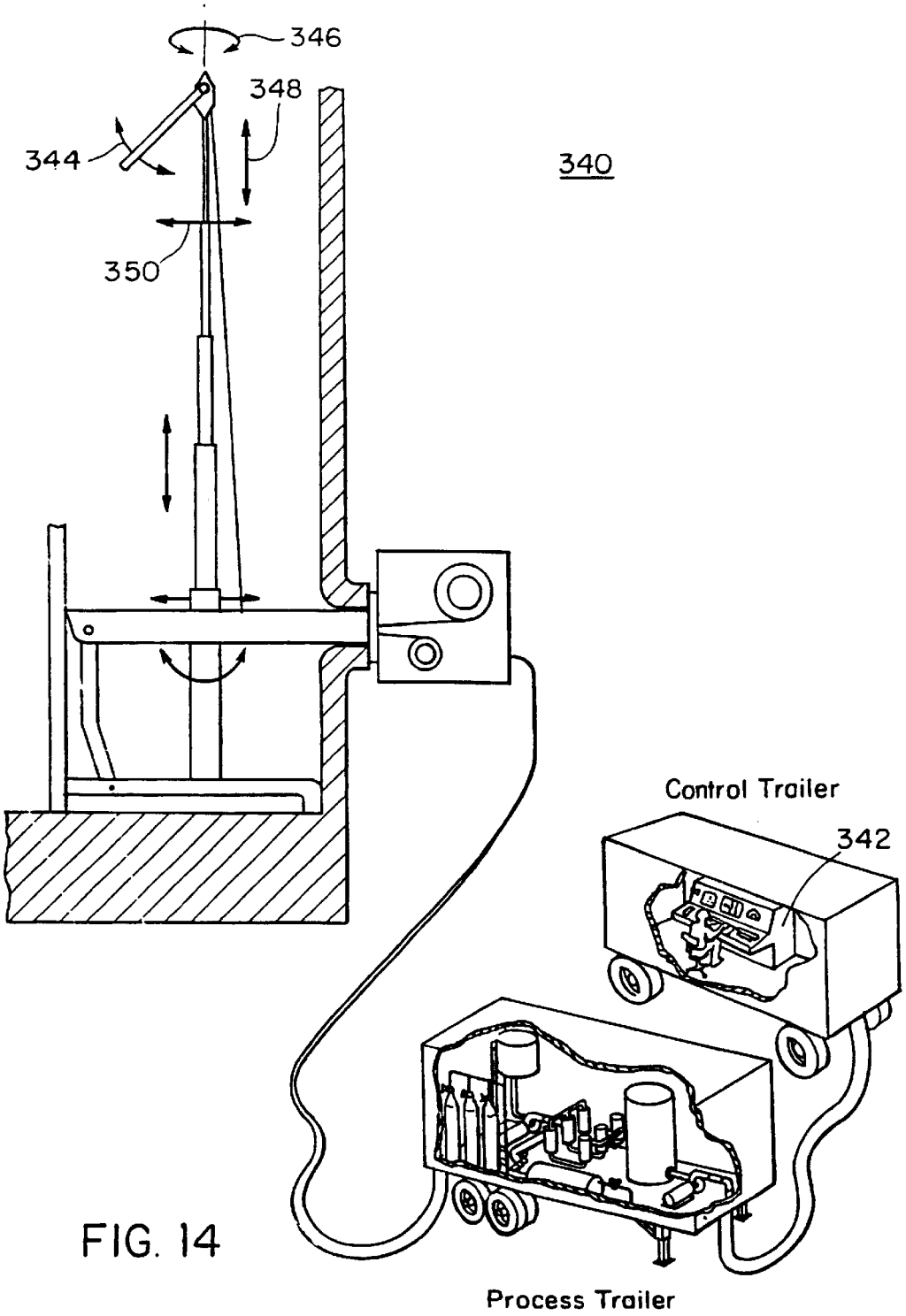
FIG. 14 is a schematic view of a control subsystem of this invention used to deploy and manipulate the cleaning heads of this invention within the steam generator during cleaning.

The control subsystem 340 shown in FIG. 14 provides the means of controlling all process system functions as well as those of the vertical deployment/support systems and intertube access rigid wand subsystems. All major system actuations are under closed-loop control with position feed back from encoders. A computer interface as shown at 342 provides control as well as position and function information. Relative motions, such as jet sweeping in the tube gaps as depicted by arrow 344, rotation of the cleaning head as depicted by arrow 346, raising and lowering of the cylinders of the deployment/support subsystem as depicted by arrow 348 and translational movement of the deployment subsystem as depicted by arrow 350 to affect cleaning according to the methodology depicted in FIGS. 5A–5C is programmed for automatic execution. The control console also includes a monitor for the video system. The intertube access system must enter the 0.406" gaps and utilizes a Welch Allyn video probe, customized to 0.250" diameter.

Although specific features of the invention are shown in some drawings and not others, this is for convenience only as some feature may be combined with any or all of the other features in accordance with the invention.

Other embodiments will occur to those skilled in the art and are within the following claims:

What is claimed is:

[1. An upper bundle steam generator cleaning system comprising:

a cleaning head means deployment and support device receivable within the steam generator and including means to raise and position a cleaning head means about the upper bundles of the steam generator, said cleaning head means deployment and support device including a translation rail extending between a hand hole of steam generator and a center tie rod along the blow down lane; and cleaning head means mounted with said support device; said cleaning head means including means for directing fluid about the tubes of the upper bundles of the steam generator for cleaning the generator from the top down thereby flushing deposits downward during the cleaning process.]

[2. The system of claim 1 in which said deployment and support device further includes a rotation stage including a number of vertically extendable cylinders pivotably mounted on said translation rail.]

[3. The system of claim 1 in which said cleaning head means includes means for directing fluid between the tubes from a flow slot.]

[4. The system of claim 1 in which a number of said nozzles are opposed to each other for cleaning tubes on opposite sides of a flow slot at the same time and for balancing any thrust received by the arm.]

[5. The system of claim 1 further including means for changing the pitch orientation of said nozzles.]

[6. The system of claim 1 further including means for rotating said arm to spray fluid about tubes proximate an adjacent flow slot.]

[7. The system of claim 3 in which said cleaning head means includes means for directing fluid between the tubes from in between the tubes.]

[8. The system of claim 7 in which said means for directing fluid from between the tubes includes a lance extendable between the tubes, said lance having a number of nozzles for spraying fluid about the tubes from between the tubes.]

[9. The system of claim 8 in which said lance is rotatable from a position about said support device to a position between the tubes.]

[10. The system of claim 1 further including means for releasably supporting said cleaning head means about a flow slot.]

[11. The system of claim 10 in which said means for releasably supporting includes rotatable fingers engagable with a side wall of a flow slot in a tube sheet support plate.]

[12. An upper bundle nuclear power plant steam generator cleaning system for cleaning the generator from the top down thereby flushing deposits downward during the cleaning process, the system comprising:

a cleaning head deployment and support device including means for positioning a cleaning head at a flow slot about the upper bundles of a steam generator;

a bulk cleaning head affixable to said support device including an arm extendable along the direction of a flow slot for directing a fluid between the tubes from the flow slot, said arm having a plurality of nozzles alienable with spaces between the tubes proximate the flow slot, said nozzles opposed to each other for cleaning tubes on opposite sides of the flow slot at the same time and balancing any thrust received by the arm; and a cleaning head lance affixable to said support device including means for directing fluid between the tubes from in between the tubes.]

[13. The system of claim 12 further including means for changing the pitch orientation of said nozzles.]

[14. The system of claim 12 further including means for rotating said arm to spray fluid about tubes proximate an adjacent flow slot.]

[15. The system of claim 12 in which said lance is extendable to a position between the tubes, said lance having a number of nozzles for spraying fluid about the tubes from in between the tubes.]

[16. The system of claim 15 in which said lance is rotatable from a position about the support device for deployment of the lance to a position between the tubes for cleaning.]

[17. The system of claim 12 further including means for supporting said cleaning heads about a tube sheet of the steam generator.]

[18. A method of cleaning a steam generator from the top down, the method comprising:

inserting a cleaning head device through a hand hole of the steam generator and deploying the cleaning head upwards to a position about a flow slot of the upper tube bundles of the steam generator;

directing fluid about the upper tube bundles proximate the cleaning head device including spraying the tubes from a cleaning head located about a flow slot; and successively lowering the cleaning head and repositioning it proximate the next lower flow slot; and again directing fluid about the tube bundles proximate the cleaning head device thereby flushing deposits downward during the cleaning process.]

[19. The method of claim 18 in which directing fluid about the tube bundles includes positioning the cleaning head to clean tubes proximate said flow slot; moving said cleaning head to a position proximate an adjacent flow slot for cleaning tubes proximate that flow slot; and moving said cleaning head to a position proximate another adjacent flow slot for cleaning tubes proximate that adjacent flow slot thereby achieving full cleaning coverage without retracting the cleaning head device.]

[20. The method of claim 18 in which directing fluid about the tube bundles includes spraying water first on one side of a tube gap and then on the other side of a tube gap.]

[21. The method of claim 18 in which directing fluid about the tube bundles includes inserting a cleaning head in between the rows of tubes.]

[22. The method of claim 18 further including filling the steam generator with water and lowering the level of water therein as the cleaning head is lowered to allow additional agitation and cleaning as the directed fluid strikes the water surface.]

[23. The system of claim 1 in which said cleaning head means further includes a cleaning head lance affixable to said support device including means for directing fluid between the tubes from between the tubes.]

[24. An upper bundle steam generator cleaning system comprising:

a cleaning head deployment and support device receivable within the steam generator and including means to raise and position a cleaning head about the upper bundles of the steam generator; and a cleaning head lance affixable to said support device including means for directing fluid between the tubes from between the tubes.]

[25. The system of claim 24 further comprising a bulk cleaning head affixable to said support device including an arm extendable along the direction of the flow slot, said arm having a plurality of nozzles alignable with spaces between the tubes proximate the flow slot for directing fluid between the tubes from the flow slot.]

[26. An upper bundle steam generator cleaning system comprising:

a cleaning head means deployment and support device receivable within the steam generator and including means to raise and position a cleaning head means about the upper bundles of the steam generator; and cleaning head means mounted with said support device; said cleaning head means including means for directing fluid about the tubes of the upper bundles of the steam generator said means for directing fluid including an arm extendable along the direction of a flow slot, said arm having a plurality of nozzles alignable with spaces between the tubes said nozzles opposed to each other for cleaning tubes on opposite sides of a flow slot at the same time and for balancing any thrust received by the arm.]

[27. The system of claim 26 further including means for change the pitch orientation of said nozzles.]

[28. An upper bundle steam generator cleaning system comprising:

a cleaning head means deployment and support device receivable within the steam generator and including means to raise and position a cleaning head means about the upper bundles of the steam generator;

cleaning head means mounted with said support device; said cleaning head means including means for directing fluid about the tubes of the upper bundles of the steam generator; and means for releasably supporting said cleaning head means about the tubes of the upper bundles of the generator.]

[29. The system of claim 28 in which said means for releasably supporting includes rotatable fingers engagable with a side wall of a flow slot or adjacent tubes in a tube support plate.]

[30. An upper bundle nuclear power plant steam generator cleaning system for cleaning the generator from the top down thereby flushing deposits downward during the cleaning process, the system comprising:

a cleaning head deployment and support device including means for positioning a cleaning head within a flow slot about the upper bundles of a steam generator;

a bulk cleaning head affixable to said support device including means for directing fluid between the tubes from the flow slot;

a cleaning head lance affixable to said support device including means for directing fluid between the tubes from in between the tubes; and means for supporting said cleaning heads about a tube support plate of the steam generator.]

[31. A method of cleaning a steam generator from the top down, the method comprising:

inserting a cleaning head device through a hand hole of the steam generator and deploying the cleaning head upwards to a position about a flow slot of the upper tube bundles of the steam generator;

inserting a cleaning head between the rows of tubes and directing fluid about the upper tube bundles proximate the cleaning head device; and successively lowering the cleaning head and repositioning it proximate the next lower flow slot; and again directing fluid about the tube bundles proximate the cleaning head device thereby flushing deposits downward during the cleaning process.]

[32. A method of cleaning a steam generator from the top down, the method comprising:

inserting a cleaning head device through a hand bole of the steam generator and deploying the cleaning head upwards to a positioning about a flow slot of the upper tube bundles of the steam generator;

directing fluid about the upper tube bundles proximate the cleaning head device;

successively lowering the cleaning head and repositioning it proximate the next lower flow slot;

again directing fluid about the tube bundles proximate the cleaning head device thereby flushing deposits downward during the cleaning process; and filling the steam generator with water and lowering the level of water therein as the cleaning head is lowered to allow additional agitation and cleaning as the directed fluid strikes the water surface.]

[33. An upper bundle steam generator cleaning system comprising:

a cleaning head means deployment and support device receivable within the steam generator and including means to raise and position a cleaning head means about the upper bundles of the steam generator;

cleaning head means mounted with said support device; said cleaning head means including means for directing fluid about the tubes of the upper bundles of the steam generator; and means for registering said cleaning head means about the upper bundles of the steam generator during cleaning.]

*34. An upper bundle steam generator cleaning system comprising:*

*a cleaning head deployment and support device receivable within the steam generator and including means to raise and position a cleaning head about the upper bundles of the steam generator, said cleaning head deployment and support device including a translation rail extending between a band hole of said steam generator and a center tie rod along a blow down line; and*

*a cleaning head mounted on said support device; said cleaning head including an arm extendable along a direction of a flow slot, said arm having a plurality of nozzles alignable with spaces between tubes for directing fluid about the tubes of the upper bundles of the steam generator for cleaning the generator from the top down, thereby flushing deposits downward during the cleaning process.*

*35. The system of claim 34 in which said support device further includes a rotation stage including a number of vertically extendable cylinders pivotably mounted on said translation rail.*

*36. The system of claim 34 in which said cleaning head includes means for directing fluid between the tubes from a flow slot.*

*37. The system of claim 34 in which a number of said nozzles are opposed to each other for cleaning tubes on opposite sides of said flow slot at the same time and for balancing any thrust received by the arm.*

*38. The system of claim 34 further including means for changing pitch orientation of said nozzles.*

*39. The system of claim 34 further including means for rotating said arm to spray fluid about tubes proximate an adjacent flow slot.*

*40. The system of claim 34 in which said cleaning head includes means for directing fluid between the tubes when said cleaning head means is located between the tubes.*

*41. The system of claim 40 in which said means for directing fluid from between the tubes includes a lance extendable between the tubes, said lance having a number of nozzles for spraying fluid about the tubes when said lance is located between the tubes.*

*42. The system of claim 41 in which said lance is rotatable from a position about said support device to a position between the tubes.*

*43. The system of claim 34 further including means for releasably supporting said cleaning head about said flow slot.*

*44. The system of claim 43 in which said means for releasably supporting includes rotatable fingers engageable with a side wall of said flow slot in a tube sheet support plate.*

45. An upper bundle nuclear power plant steam generator cleaning system for cleaning a generator having tubes from the top down thereby flushing deposits downward during the cleaning process, the system comprising:

a cleaning head deployment and support device including means for positioning a cleaning head at a flow slot about the upper bundle of a steam generator;

a bulk cleaning head affixable to said support device including an arm extendable along the direction of said flow slot for directing a fluid between the tubes from the flow slot, said arm having a plurality of nozzles alignable with spaces between the tubes proximate the flow slot, said nozzles opposed to each other for cleaning the tubes on opposite sides of the flow slot at the same time and balancing any thrust received by the arm; and a cleaning head lance affixable to said support device including means for directing fluid between the tubes when said lance is located between the tubes.

46. The system of claim 45 further including means for changing pitch orientation of said nozzles.

47. The system of claim 45 further including means for rotating said arm to spray fluid about tubes proximate an adjacent flow slot.

48. The system of claim 45 in which said lance is extendable to a position between the tubes, said lance having a number of nozzles for spraying fluid about the tubes when said lance is located between the tubes.

49. The system of claim 48 in which said lance is rotatable from a position about said support device for deployment of said lance to a position between the tubes for cleaning.

50. The system of claim 45 further including means for supporting said cleaning head about a tube sheet of the steam generator.

51. A method of cleaning a steam generator having tubes from the top down, the method comprising:

inserting a cleaning head device through a hand hole of the steam generator and deploying the cleaning head upwards to a position about a flow slot of an upper tube bundle of the steam generator;

directing fluid about the upper tube bundles proximate the cleaning head device including spraying the tubes from a cleaning head located about said flow slot; and successively lowering the cleaning head and repositioning it proximate the next lower flow slot; and again directing fluid about the tube bundles proximate the cleaning head device thereby flushing deposits downward during the cleaning process.

52. The method of claim 51 in which directing fluid about the tube bundles include positioning the cleaning head to clean tubes proximate said flow slot; moving said cleaning head to a position proximate an adjacent flow slot for cleaning tubes proximate that flow slot; and moving said cleaning head to a position proximate another adjacent flow slot for cleaning tubes proximate that adjacent flow slot, thereby achieving full cleaning coverage without retracting the cleaning head device.

53. The method of claim 51 in which directing fluid about the tube bundles includes spraying water first on one side of a tube gap and then on the other side of a tube gap.

54. The method of claim 51 in which directing fluid about the tube bundles includes inserting a cleaning head in between a rows of tubes.

55. The method of claim 51 further including filling the steam generator with water and lowering the level of water therein as the cleaning head is lowered to allow additional agitation and cleaning as the directed fluid strikes the water surface.

56. An upper bundle steam generator, cleaning system comprising:

a cleaning head deployment and support device receivable within the steam generator and including means to raise and position a cleaning head about the upper bundles of the steam generator; and a cleaning head lance affixable to said support device and extendable between the tubes, said lance including a plurality of nozzles for directing fluid between the tubes when said lance is located between the tubes.

57. The system of claim 56 further comprising a bulk cleaning head affixable to said support device including an arm extendable along a direction of a flow slot, said arm having a plurality of nozzles alignable with spaces between the tubes proximate the flow slot for directing fluid between the tubes from the flow slot.

58. An upper bundle steam generator cleaning system comprising:

a cleaning head means deployment and support device receivable within the steam generator and including means to raise and position a cleaning head means about the upper bundles of the steam generator; and cleaning head means mounted with said support device; and cleaning head means including means for directing fluid about tubes of the upper bundles of the steam generator, said means for directing fluid including an arm extendable along a direction of a flow slot, said arm having a plurality of nozzles alignable with spaces between the tubes, said nozzles opposed to each other for cleaning tubes on opposite sides of a flow slot at the same time and for balancing any thrust received by the arm.

59. The system of claim 58 further including means for changing pitch orientation of said nozzles.

60. An upper bundle steam generator cleaning system comprising:

a cleaning head deployment and support device receivable within the steam generator and including means to raise and position a cleaning head means about the upper bundles of the steam generator;

cleaning head means mounted with said support device; and cleaning head means including means for directing fluid about tubes of the upper bundles of the steam generator; and means for releasably supporting said cleaning head means about the tubes of the upper bundles of the generator.

61. The system of claim 60 in which said means for releasably supporting includes rotatable fingers engageable with a side wall of a flow slot or adjacent tubes in a tube support plate.

62. An upper bundle nuclear power plant steam generator cleaning system for cleaning the generator from the top down thereby flushing deposits downward during the cleaning process, the system comprising:

a cleaning head deployment and support device including means for positioning a cleaning head within a flow slot about the upper bundles of a steam generator;

a bulk cleaning head affixable to said support device and extendable between the tubes, said lance including a plurality of nozzles for directing fluid between tubes from the flow slot;

a cleaning head lance affixable to said support device including means for directing fluid between the tubes when said lance is located between the tubes; and

*means for supporting said cleaning heads about a tube support plate of the steam generator.*

*63. A method of cleaning a steam generator having tubes from the top down, the method comprising:*

*inserting a cleaning head device through a hand hole of the steam generator and deploying the cleaning head upwards to a position about a flow slot of an upper tube bundle of the steam generator;*

*inserting a cleaning head between the tows of tubes and directing fluid about the upper tube bundle proximate the cleaning head device;*

*successively lowering the cleaning head and repositioning it proximate a next lower flow slot; and*

*again directing fluid about the upper tube bundle proximate the cleaning head device thereby flushing deposits downward during the cleaning process.*

*64. A method of cleaning a steam generator from the top down, the method comprising:*

*inserting a cleaning head device through a hand hole of the steam generator and deploying the cleaning head device upwards to a position about a flow slot of an upper tube bundle of the steam generator;*

*directing fluid about the upper tube bundle proximate the cleaning head device;*

*successively lowering and cleaning head device and repositioning it proximate a next lower flow slot;*

*again directing fluid about the upper tube bundle proximate the cleaning head device thereby flushing deposits downward during the cleaning process; and*

*filling the steam generator with water and lowering the level of water thereby as the cleaning head device is lowered to allow additional agitation and cleaning as the directed fluid strikes the water surface.*

*65. An upper bundle steam generator cleaning system comprising:*

*a cleaning head means deployment and support deice receivable within the steam generator and including means to raise and position a cleaning head means about an upper tube bundle of the steam generator;*

*said cleaning head means mounted with said cleaning head means deployment and support device; said cleaning head means including means for directing fluid about the tubes of the upper tube bundles of the steam generator; and*

*means for registering said cleaning head means about the upper bundle of the steam generator during cleaning.*

*66. An upper bundle steam generator cleaning system comprising:*

*a cleaning head deployment and support device receivable within the steam generator including means to raise and position a bulk cleaning head about the upper bundles of the steam generator, said bulk cleaning head affixable to said support device and including an arm extendable along a direction of a flow slot, said arm having a plurality of nozzles alignable with spaces between the tubes proximate the flow slot for directing fluid between the tubes from the flow slot; and*

*a cleaning head lance affixable to said support device including means for directing fluid between the tubes when said lance is located between the tubes.*

* * * * *